F. A. BURGESS.
SEED TESTING TRAY.
APPLICATION FILED DEC. 22, 1916.
1,254,200.
Patented Jan. 22, 1918.
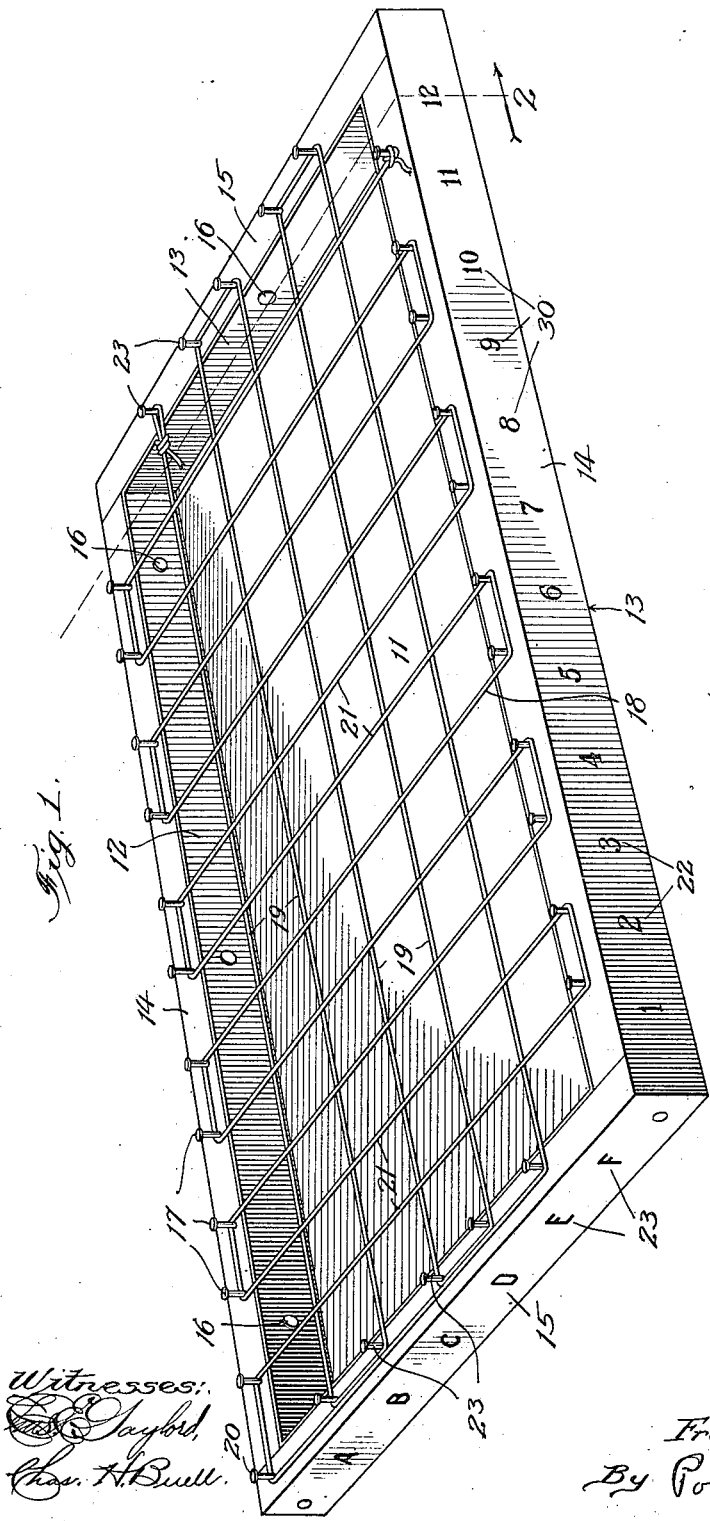
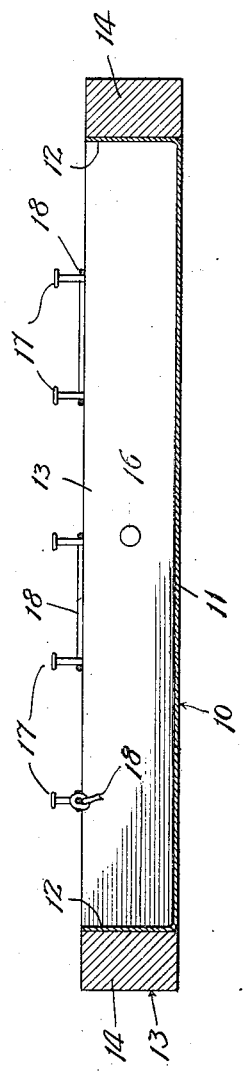
Inventor:
Frank A. Burgess,
By Poole & Warren
Att'ys.

UNITED STATES PATENT OFFICE.

FRANK A. BURGESS, OF GENEVA, ILLINOIS.

SEED-TESTING TRAY.

1,254,200. Specification of Letters Patent. Patented Jan. 22, 1918.

Application filed December 22, 1916. Serial No. 138,382.

*To all whom it may concern:*

Be it known that I, FRANK A. BURGESS, a citizen of the United States, residing at Geneva, in the county of Kane and State of Illinois, have invented new and useful Improvements in Seed-Testing Trays, of which the following is a specification.

This invention relates to improvements in seed testing or germinating devices, and more particularly to a construction of a seed testing tray or pan in which the seeds under test are planted.

As ordinarily constructed, these trays consist of a shallow pan or tray, designed to be fitted with earth or sand, there being provided means for dividing the tray into a plurality of seed sprouting compartments or sections.

Heretofore these compartments have been formed by the provision of a crate-like frame or member constructed to form a plurality of compartments separated by the intersecting walls of the compartment-forming member, which is inserted in the tray and the earth or sand filled in the compartments. A seed testing apparatus of this character is open to objection for the reason that the compartment-forming member must necessarily be fragile, owing to its crate-like construction, hence is liable to be broken in use, thereby necessitating frequent renewal. Again, these members, of either wood or metal, are subjected to long intervals of contact with damp earth and moisture, and as a consequence rapidly deteriorate, thus becoming useless or broken, to the end that a new one is required.

The purpose of this invention is to provide a simpler and cheaper construction for a seed testing device, whereby the use of a separate and fragile compartment-forming frame is entirely dispensed with, and the whole device constructed in a more rugged and substantial manner, yet retaining the desirable features of the separate seed planting compartment.

The invention consists further in the matters hereinafter described and more particularly pointed out in the appended claim.

In the accompanying drawings—

Figure 1 is a perspective view of a seed tester made in accordance with my invention; and Fig. 2 is a sectional view taken on line 2—2 of Fig. 1.

A seed testing device embodying the features of my invention comprises a shallow rectangular tray, made in any desired manner of metal or wood or both, although as a preferable construction the tray consists of a metal pan 10 having a bottom wall 11 and side walls 12, the latter being surrounded by a rectangular frame 13 of wood, made up of strips connected together, and forming the outer side walls 14, 14 and end walls 15, 15 of the tray, the vertical side walls of the metal pan being suitably connected to the wood frame, as by means of nails 16.

As a means for subdividing the tray into a plurality of seed sprouting sections or areas, there are provided along the upper edges of the tray and surrounding the pan, a plurality of upwardly projecting members, preferably in the form of pins 17, inserted along the upper faces of the side and end walls or strips 14 and 15 of the wood frame 13 in equally spaced relation, the pins on each side and end wall being directly opposite a corresponding pin on the opposite and parallel wall. The pins are furthermore spaced apart a distance equal to the dimensions of the compartments or sections to be formed, the end pins on each side being spaced inwardly from the corners of the pan the same distance as that separating the intermediate pins.

To subdivide the open top of the tray into a plurality of seed planting sections or subdivisions, a flexible member 18, preferably made of a suitable length of cord, twine, fine wire, or the like, is employed, which is stretched transversely across the top of the pan from the opposite walls, said cord being so threaded or stretched as to provide a plurality of intersecting lengths extending parallel to the side and end walls of the tray. Although the number of lengths of cord or wire used or the particular method employed in threading the same is immaterial, a desirable method is to employ a single length of cord 18, arranged as illustrated in the drawings, that is, one end of the cord or wire 18 is tied to the pin 17 at the end of one of the end walls 15 and adjacent to the upper right-hand corner of the tray (Fig. 1) by a loop or otherwise. From said pin the cord or wire is stretched across the top of the tray to the corresponding pin on the opposite end wall 15, and is passed around the said pin and the pin next adjacent thereto, returning again to the right-hand end wall to the pin next adjacent to the pin of commencement. The cord or wire is again passed around two adjacent pins, and so on backwardly and forwardly across the pan. In this manner a series of parallel lengths 19 of cord are stretched across the pan and longitudinally thereof. When all of the longitudinal lengths have been completed, the cord terminates at the lower left-hand pin 17 of the end wall 15, whereupon it is extended along the top of the end wall to a pin 20 located at the upper right-hand corner of the tray, and from this pin the cord or wire is extended to and passed around the next adjacent pin 17 on the side wall 14, and thence across the top of the tray to the corresponding pin 17 on the opposite side wall 14. Continuing the method of stretching as before described, there are formed a series of parallel transverse lengths 21 throughout the length of the tray, said transverse lengths intersecting the longitudinal lengths and forming therewith a plurality of rectangular sections or subdivisions, as shown. The free end of the cord is preferably secured or tied to the last pin engaged, thus retaining the cord in taut condition.

As a method of designating the several compartments thus formed, there are preferably marked or stamped on the sides of the strips of the wood frame 13, series of reference characters as follows: Along the side or lengthwise of the tray are provided consecutive numbers or numerals 22, each numeral being placed midway between the pins and serving to indicate the row of compartments in alinement with said number. Similarly, the end wall 15 is provided with indicating symbols, preferably letters 23, arranged, as before, intermediate the pins and serving to indicate the longitudinal rows of compartments in alinement with each letter. In this manner, each compartment would have an indicia consisting of the combination of a number and a letter, as, for instance, a compartment at the intersection of row E and row 3 would be $E^3$, and so on.

In the use of the device, the tray is first filled with a layer of earth or other substance, in which the seeds to be tested are planted, to the level of the pan, and then the cord or wire 18 is stretched across the top of the tray to divide the upper surface of the layer of earth into a plurality of sections or subdivisions in the manner hereinbefore described. The seeds to be tested are then planted in the separate compartments, the source of the seeds planted in each compartment being tagged or labeled in accordance with the designation of each compartment. Thus, if seeds from one source are planted in the subdivision $F^1$ and from another in $E^3$, and so on, the several sources can be marked accordingly, thus enabling a record to be kept of the growing qualities of seeds from a number of sources. After the test has been completed, the tray may be readily emptied by first removing the cord or wire 18 from the pins and inverting the tray.

My improved seed tester possesses several advantages, among them being the fact that the planting sections are formed by a cord or wire 18, which is extended across the tray above the upper surface of the layer of earth, and not in the same, hence the earth is not divided by the compartment-forming member, thus permitting free circulation of air and moisture therethrough, and, further, the compartment-forming member, not being embedded in the layer of earth, is not subjected to moisture and the deteriorating action of the earth layer. Then again, due to the fact that the subdividing member is made of cord or wire, any suitable form may be used, which can be supplied by the user of the device whenever necessary, thus the initial cost of the seed tester is reduced, as well as the cost of renewal of parts, inasmuch as cord is plentiful and no particular kind is required. Moreover, the fact that the subdivider 18 is in the form of a cord or wire, makes the filling of the tray with earth much more convenient and easier, inasmuch as the cord is not positioned until the tray is filled. And so, also, in emptying the tray, it is only necessary to first remove the cord, and the tray can be thoroughly emptied and cleaned, with very little trouble and inconvenience. As to the pins 17, these can be in the form of nails, which would equally well serve the purpose, hence can be easily replaced at little or no cost to the user.

Although I have shown and described herein in detail one preferred form of seed tester embodying the features of my invention, it is to be of course understood that the details of construction and arrangement of parts shown may be variously changed and modified without departing from the spirit and scope of my invention, and I do not want to be limited to the details of construction shown and illustrated, except as defined by the appended claim.

I claim as my invention:

A seed testing device, comprising a tray provided with pins spaced around the margins thereof, and a single flexible cord threaded back and forth between said pins in parallel relation longitudinally and transversely of the tray to form a plurality of substantially rectangular seed planting compartments.

In testimony that I claim the foregoing as my invention I affix my signature in the presence of two witnesses, this 19th day of December, A. D. 1916.

FRANK A. BURGESS.

Witnesses:
E. H. WOLCOTT,
H. W. NORTON.

Copies of this patent may be obtained for five cents each, by addressing the "Commissioner of Patents, Washington, D. C."